(12) United States Patent
Grizzle

(10) Patent No.: US 10,455,761 B1
(45) Date of Patent: Oct. 29, 2019

(54) APPARATUS FOR ADDING FERTILIZER TO WATER IN A SPRINKLER SYSTEM

(71) Applicant: American Hydro Systems, Inc., Fort Wayne, IN (US)

(72) Inventor: Glen Grizzle, Murrieta, CA (US)

(73) Assignee: American Hydro Systems, Inc., Fort Wayne, IN (US)

( * ) Notice: Subject to any disclaimer, the term of this patent is extended or adjusted under 35 U.S.C. 154(b) by 0 days.

(21) Appl. No.: 15/683,259

(22) Filed: Aug. 22, 2017

(51) Int. Cl.
*B05B 7/30* (2006.01)
*A01C 23/04* (2006.01)

(52) U.S. Cl.
CPC .............. *A01C 23/042* (2013.01); *B05B 7/30* (2013.01)

(58) Field of Classification Search
CPC ........ F16K 15/02; F16K 15/021; F16K 15/06; A01C 23/042; B05B 7/30
USPC ........................................................ 239/463
See application file for complete search history.

(56) References Cited

U.S. PATENT DOCUMENTS

| | | | |
|---|---|---|---|
| 1,720,326 A * | 7/1929 | Halstead | C02F 1/686 137/99 |
| 3,549,048 A * | 12/1970 | Goodman | G05D 11/006 137/99 |
| 3,642,171 A * | 2/1972 | Ernst | B01J 4/02 137/98 |
| 4,062,378 A * | 12/1977 | Bender | F16K 15/02 137/269.5 |
| 4,370,996 A * | 2/1983 | Williams | G05D 11/035 137/99 |
| 4,432,105 A * | 2/1984 | Pitroda | E03C 1/046 137/893 |
| 4,651,765 A * | 3/1987 | Beth | G05D 11/008 137/564.5 |
| 5,366,159 A | 11/1994 | Childers | |
| 6,533,557 B1 | 3/2003 | Williams | |
| 6,997,350 B2 | 2/2006 | Johnson et al. | |

* cited by examiner

Primary Examiner — Chee-Chong Lee
(74) Attorney, Agent, or Firm — Barnes & Thornburg LLP

(57) ABSTRACT

An apparatus for injecting liquid fertilizer into a water flow line in a sprinkler system, includes an injector mechanism body having a water inlet and a water outlet adapted to be connected in the water flow line of the sprinkler system so that water flows through at least a portion of the injector mechanism body, a plunger chamber, a plunger movably positioned in the plunger chamber, a paddle wheel positioned to be rotated by water flowing through the injector mechanism body, a plunger gear coupled to the paddle wheel and the plunger so as to rotate when the paddle wheel rotates so as to move the plunger back and forth within the plunger chamber and a valve assembly secured at a fixed location in the plunger chamber.

3 Claims, 6 Drawing Sheets

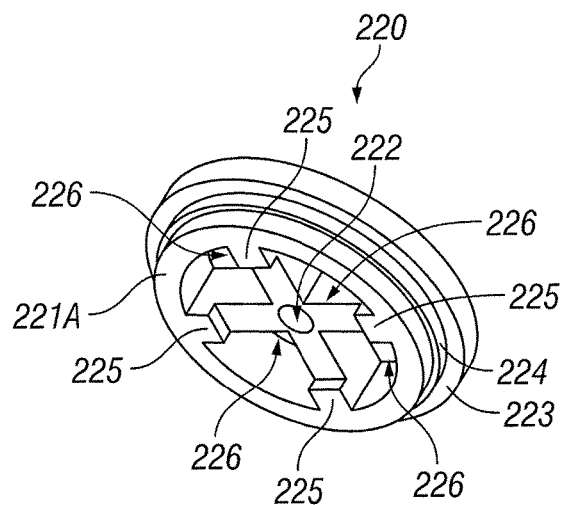
FIG. 8
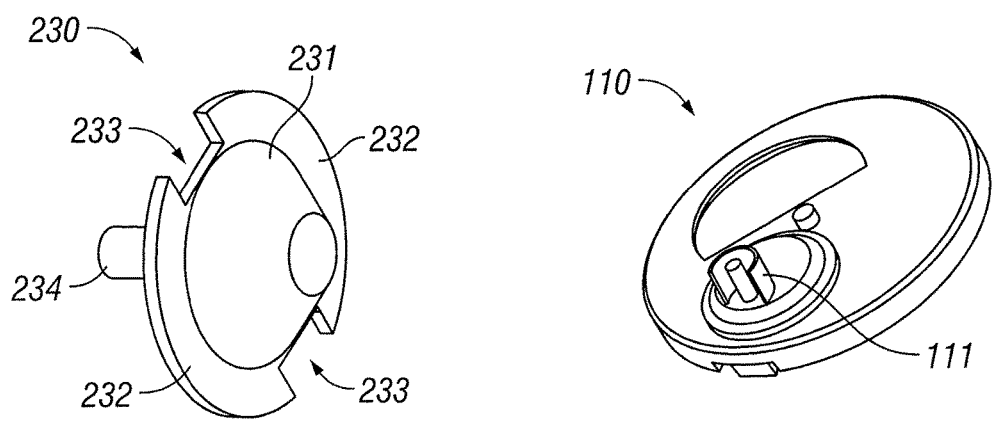
FIG. 9
FIG. 10

US 10,455,761 B1

APPARATUS FOR ADDING FERTILIZER TO WATER IN A SPRINKLER SYSTEM

BACKGROUND AND SUMMARY OF THE INVENTION

In one embodiment of the present invention, an apparatus for injecting liquid fertilizer into a water flow line in a sprinkler system, includes an injector mechanism body having a water inlet and a water outlet adapted to be connected in the water flow line of the sprinkler system so that water flows through at least a portion of the injector mechanism body, a plunger chamber, a plunger movably positioned in the plunger chamber, a paddle wheel positioned to be rotated by water flowing through the injector mechanism body, a plunger gear coupled to the paddle wheel and the plunger so as to rotate when the paddle wheel rotates so as to move the plunger back and forth within the plunger chamber and a valve assembly secured at a fixed location in the plunger chamber.

In one embodiment of the present invention, the valve assembly includes a first retaining member, a second retaining member and a valve member positioned in a space between the first and second retaining members. In one embodiment, the valve member is moveable in the space between the first retaining member and the second retaining member.

In another embodiment of the present invention, the valve member and the first retaining member each include a conical surface and the conical surface of the valve member seals against the conical surface of the first retaining member so as to prevent fluid flow through the valve assembly in at least one direction.

In yet another embodiment of the present invention, the valve member includes a flange, the second retaining member includes a projection and the flange of the valve member is supported on the projection so as to provide a fluid flow path around the flange. In one embodiment, the valve member includes two flanges separated by two notches, the second retaining member includes four projections and two of the projections engage the notches of the valve member and the remaining two projections support the flanges of the valve member so as to form fluid flow paths around the flanges.

In another embodiment, the valve assembly permits fluid flow in only one direction.

Additional features will become apparent to those skilled in the art upon consideration of the following detailed description of embodiments of the invention and accompanying drawings.

BRIEF DESCRIPTION OF THE DRAWINGS

FIG. 8 is a sectional view through the second retaining member shown in FIG. 7.

FIG. 9 is a perspective view of a valve member that is a component of the liquid fertilizer injector apparatus shown in FIG. 4.

FIG. 10 is a perspective view of a cover that is a component of the liquid fertilizer injector apparatus shown in FIG. 4.

DETAILED DESCRIPTION OF EMBODIMENTS OF THE INVENTION

Figure 1:
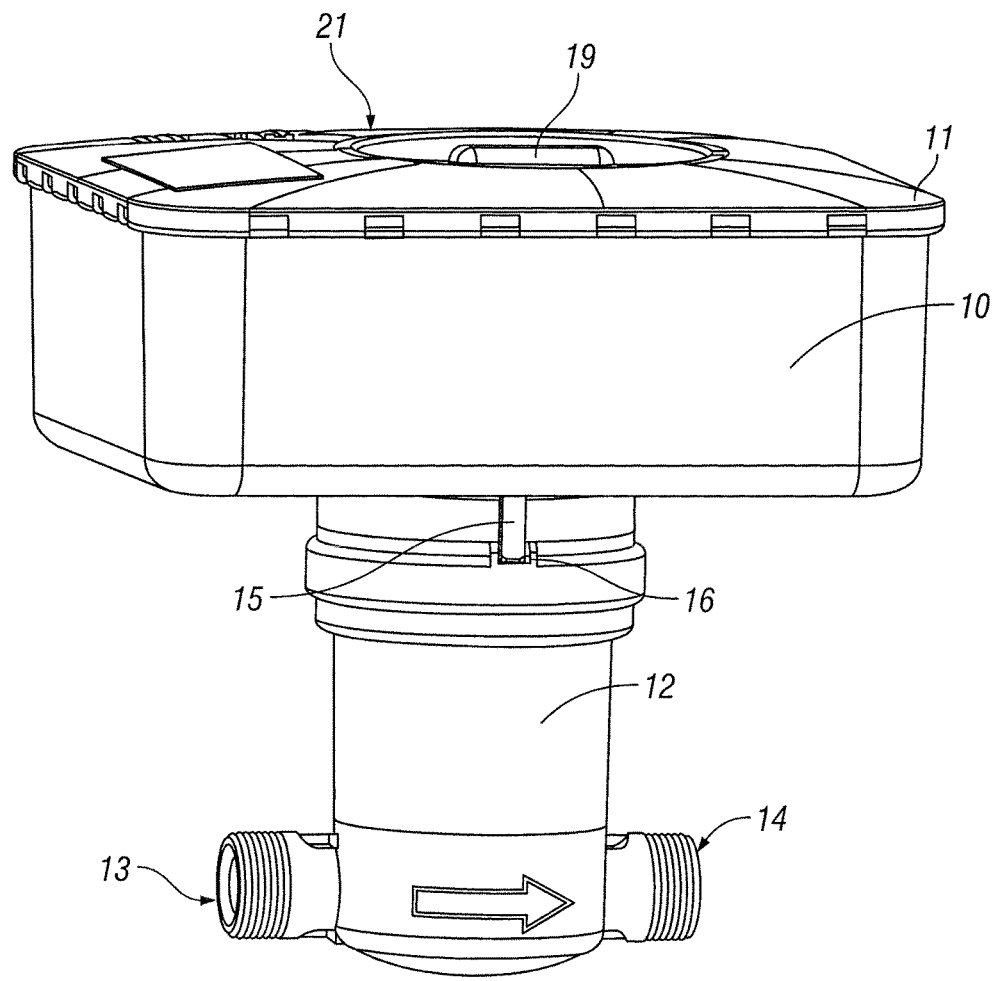
FIG. 1 is a side view of a prior art liquid fertilizer injector apparatus.
Figure 2:
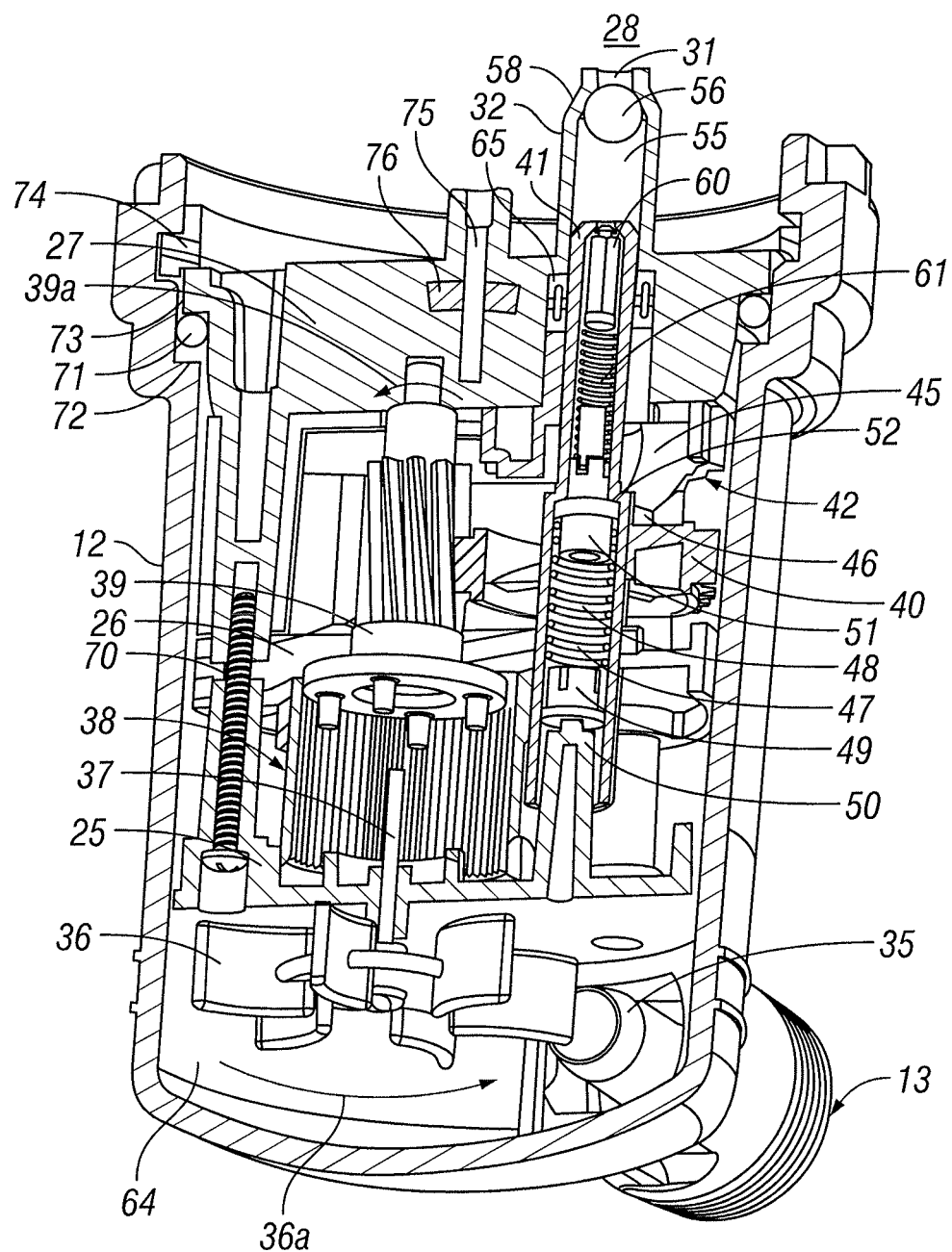
FIG. 2 is a vertical section through the injector apparatus shown in FIG. 1.
Figure 3:
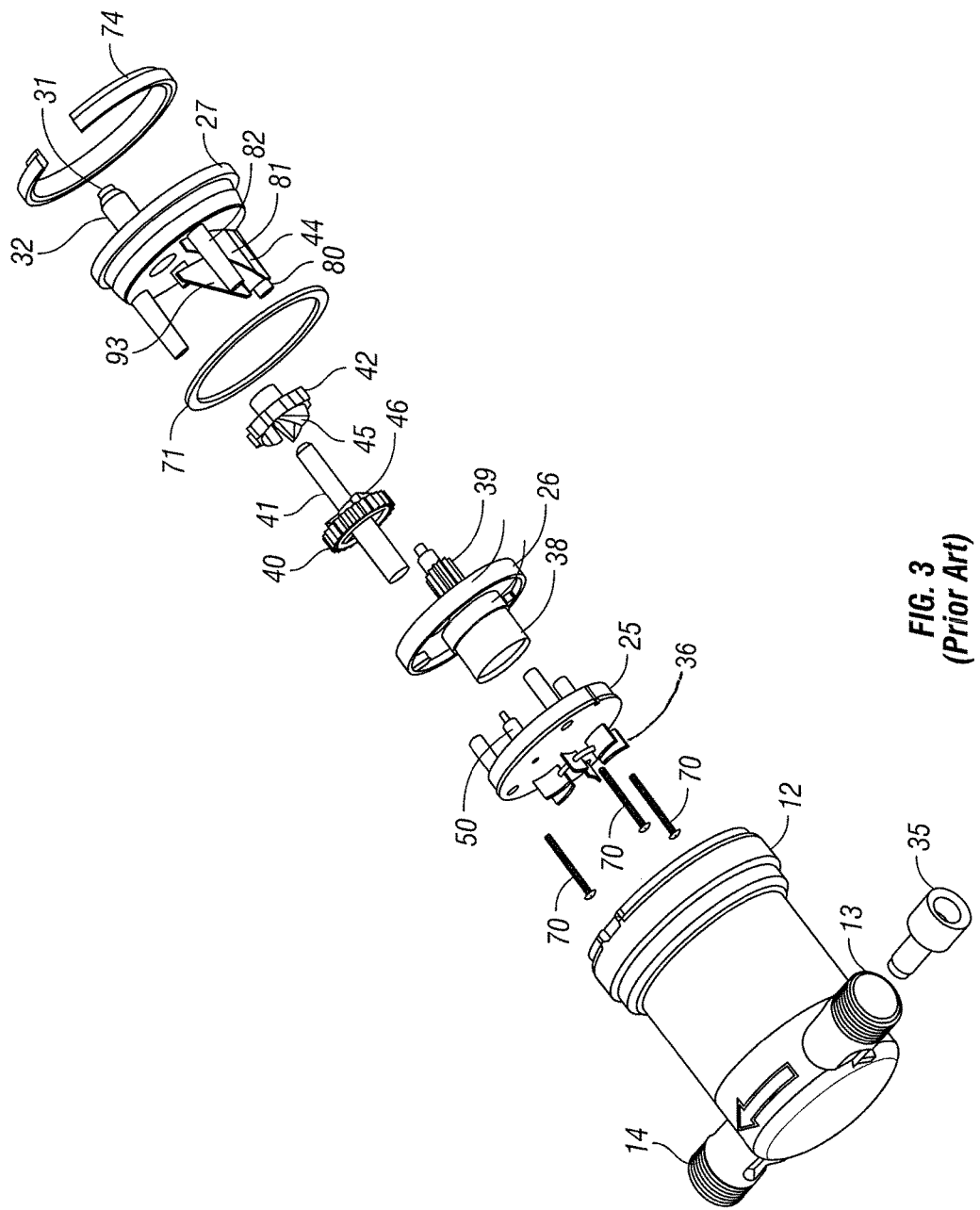
FIG. 3 is an exploded view of certain components of the injector apparatus shown in FIG. 1.

FIGS. 1-3 illustrate a prior art fertilizer injector apparatus more fully disclosed in U.S. Pat. No. 6,997,350, the disclosure of which is hereby incorporated by reference in its entirety, including as part of the disclosure of the present invention. The prior art fertilizer injector apparatus includes a liquid fertilizer reservoir 10, a lid 11 for the reservoir, an injector mechanism body 12, a water inlet 13 and water outlet 14 that connect in a sprinkling system water pipe or line (not shown) so that water flowing through the sprinkler system water line to the sprinklers in the sprinkler system flows through a portion of injector mechanism body 12. Liquid fertilizer reservoir 10 fits onto the top of injector mechanism body 12 and includes two tabs 15 that engage slots 16 on the injector mechanism body 12 to maintain rotational alignment of the reservoir. Note that only one tab and slot is shown in FIG. 2. The fertilizer injector apparatus further includes an "on" "off" knob 19.

As shown in FIGS. 2 and 3, injector mechanism body 12 holds and positions a lower plate 25, an intermediate plate 26 and a bulkhead 27. A secondary reservoir 28 is formed between the bottom of reservoir 10 and the top of bulkhead 27 over injector mechanism body 12. Liquid fertilizer flows through reservoir bottom opening 29 into secondary reservoir 28. Liquid fertilizer enters a mechanical injection device of the injector mechanism through an inlet 31 in the top of a plunger chamber 32.

The fertilizer injector apparatus is powered by water flowing through the sprinkler water flow line into water inlet 13, through a nozzle 35 and across a paddle wheel 36. The flowing water causes rotation of paddle wheel 36, here shown to be in a clockwise direction looking downwardly as shown by arrow 36*a*, which, in turn, causes liquid fertilizer from reservoir 10 which flows through secondary reservoir 28 and into plunger chamber inlet 31 to be injected into the water from the sprinkler system water flow line flowing through the apparatus.

The rotating paddle wheel 36, through shaft 37 rotatably held in lower plate 25, turns a planetary gear set 38, held by lower plate 25 and intermediate plate 26, which, in turn, spins an output pinion 39. Output pinion 39 extends between and is rotatably held in position by intermediate plate 26 and bulkhead 27. The revolving output pinion 39 turns plunger gear 40 which is part of and concentric with plunger 41. Thus, rotation of plunger gear 40 causes rotation of plunger 41.

As plunger gear 40 rotates, it rotates against a ratchet 42 that is held stationary against the clockwise rotation of plunger gear 40 by a pawl arm 43 of pawl 44. Ratchet 42 has slanted ratchet tabs 45 extending downwardly from the bottom thereof. The slanted ratchet tabs 45 act as ramps for similarly slanted plunger tabs 46 extending upwardly from plunger gear 40. The confronting camming surfaces of ratchet tabs 45 and the plunger tabs 46 push against one another as the plunger gear rotates in relation to the ratchet and force plunger 41 to move downwardly against the bias of a plunger spring 47 within plunger central bore 48. The lower end of plunger spring 47 is supported by a spring retainer 49 that rotates freely on a post 50 projecting from the lower plate 25. As plunger 41 rotates, plunger spring 47 and spring retainer 49 freely rotate with it. A spring guide 51 engages the top of plunger spring 47 and shoulder 52 in plunger central bore 48 to compress plunger spring 47 as plunger 41 moves downwardly.

Plunger 41 slides in plunger chamber 32 which connects through plunger chamber inlet 31 to liquid fertilizer secondary reservoir 28 so that liquid fertilizer held in secondary reservoir 28 flows into a space 55 between plunger chamber inlet 31 and the top of plunger 41. A buoyant check ball 56, made of a material, such as plastic, that floats in water and liquid fertilizer, is positioned in a narrowed, conical entrance 58 from secondary reservoir 28 to space 55 to form a check valve to prevent reverse flow of liquid fertilizer from plunger chamber space 55 back into secondary reservoir 28 and reservoir 10. As plunger 41 rotates and moves downwardly in plunger chamber 32, liquid fertilizer flows by gravity from secondary reservoir 28 past check ball 56 into the space 55. As liquid fertilizer fills space 55, check ball 56 floats and rises against narrow conical entrance 58. In the prior art device, it has been found that the liquid fertilizer reservoir 10 should be positioned above the injection mechanism housing so that the liquid fertilizer can flow by gravity into the plunger chamber.

As indicated, rotation of paddle wheel 36 causes rotation of plunger gear 40. This rotation causes interaction of plunger tabs 46 and ratchet tabs 45 to cause plunger 41 to move downwardly and allow liquid fertilizer to flow into space 55, which space enlarges as plunger 41 moves downwardly in plunger chamber 32. As the plunger tabs 46 reach the top of ratchet tabs 45, continuing rotation of plunger gear 40 causes the plunger tabs to fall off the ratchet tabs. The plunger spring 47 then forces plunger 41 upwardly in plunger chamber 32. Flow of liquid fertilizer from plunger chamber 32 back into secondary reservoir 28 is blocked by check ball 56. Therefore, the plunger 41 moving upwardly in plunger chamber 32 puts the liquid fertilizer trapped in space 55 under pressure. A check pin 60 in the end of plunger 41 is held in normally closed position closing the upper end of plunger central bore 48, which forms a flow passage for the liquid fertilizer through plunger 41, by check spring 61. The bottom of check spring 61 is supported in plunger central bore 48 by spring guide 51 while the top of check spring 61 rests against check pin 60. The plunger spring 47 is stronger than check spring 61 so overcomes the sealing force of check spring 61 on check pin 60 by exerting pressure to force plunger 41 upwardly. This pressurizes the liquid in space 55 to the extent that it moves check pin 60 against the bias of check spring 61 so that liquid fertilizer in space 55 flows around check pin 60 into plunger central bore 48, around post projection 50, and onto lower plate 25 from where it can flow around the circumference of lower plate 25. The liquid fertilizer then mixes with the water as the water passing the paddle wheel flows up into this area or as the fertilizer flows down around the circumference of lower plate 25 and into mixing chamber 64 where paddle wheel 36 is located. Check spring 61 has sufficient strength to provide necessary sealing force to check pin 60 to prevent the liquid fertilizer from being sucked downwardly from space 55 and secondary reservoir 28 into the mixing chamber 64 if the sprinkler water flow line is ever subject to a negative pressure. As plunger gear 40 continues to rotate, there is a period of noninteraction between the tab camming surfaces until the tabs again meet and interact to again move the plunger gear and plunger downward.

Figure 4:
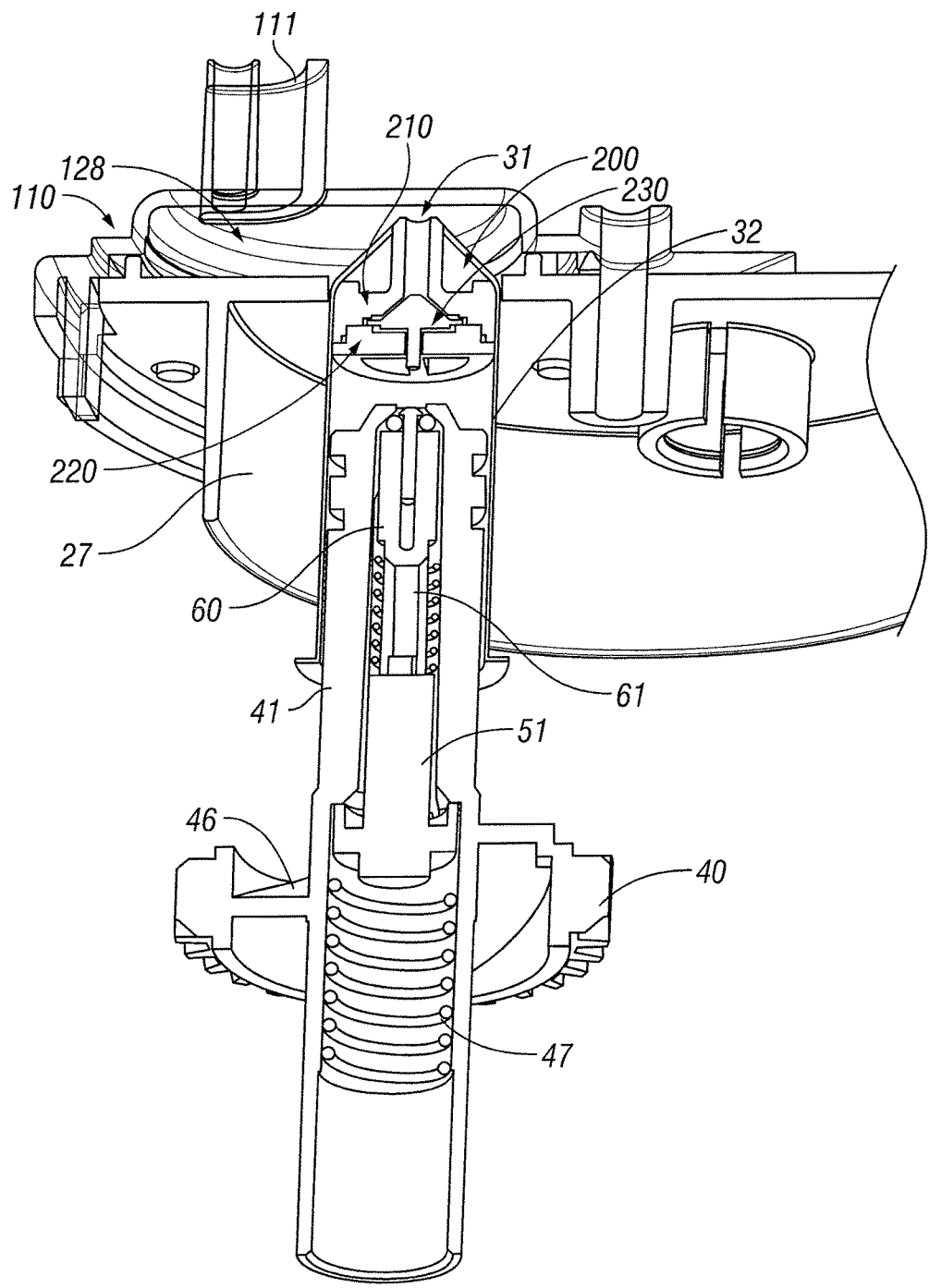
FIG. 4 is a sectional view of certain components of a liquid fertilizer injector apparatus according to one embodiment of the present invention.
Figure 5:
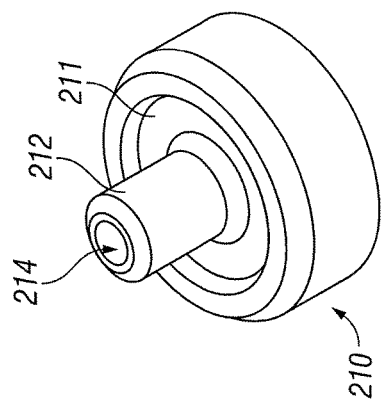
FIG. 5 is a perspective view of a first retaining member that is a component of the liquid fertilizer injector apparatus shown in FIG. 4.
Figure 6:
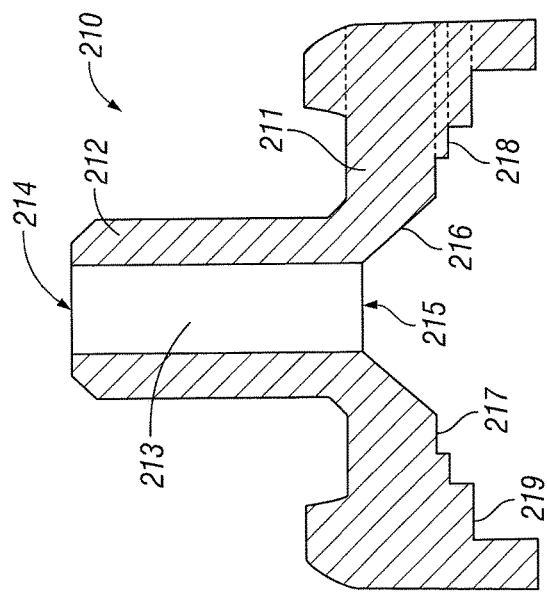
FIG. 6 is a sectional view through the first retaining member shown in FIG. 5.

FIG. 4 shows a sectional view of certain components of a fertilizer injector apparatus according to one embodiment of the present invention. In this embodiment of the invention, liquid fertilizer reservoir 10 has been replaced with a cover 110 and check ball 56 has been replaced with a valve assembly 200. Referring to FIGS. 5 and 6, valve assembly 200 includes a first retaining member 210, a second retaining member 220 and a valve member 230. First retaining member 210 includes a base 211 with a projection 212 extending therefrom. A fluid passageway 213 has a first open end 214 and a second open end 215. The side of base 211 opposite projection 212 has a conical surface 216, a first stepped surface 217, a second stepped surface 218 and a third stepped surface 219.

Figure 7:
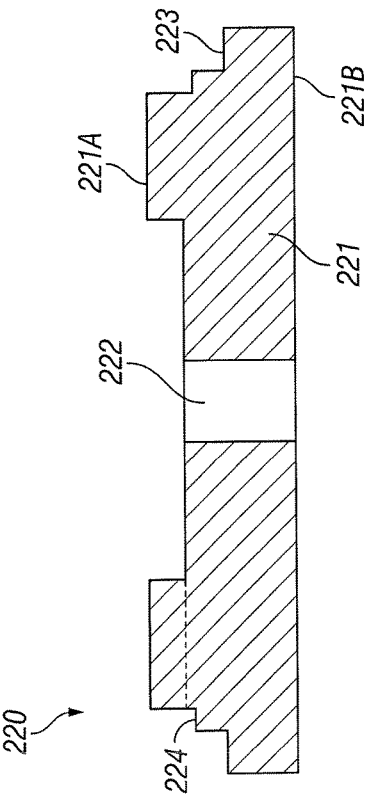
FIG. 7 is a perspective view of a second retaining member that is a component of the liquid fertilizer injector apparatus shown in FIG. 4.

Referring to FIGS. 7 and 8, second retaining member 220 includes a base 221 having a central bore 222 extending there through from an upper surface 221A to a lower surface 221B, a first stepped surface 223, a second stepped surface 224, a plurality of projections 225 and a plurality of open areas 226. Referring to FIGS. 7 and 8, second retaining member 220 includes a base 221 having a central bore 222 extending there through from an upper surface 221A to a lower surface 221B, a first stepped surface 223, a second stepped surface 224, a valve member support surface 225, a plurality of projections 225 and a plurality of open areas 226.

Referring to FIG. 9, valve member 230 is preferably made from a flexible material such as rubber and includes a conical surface 231, a pair of flanges 232 separated by notches 233 and a post 234 extending from valve member 230 opposite conical surface 231.

Valve assembly 200 is assembled by positioning valve member 230 such that post 234 extends through central bore 222 of second retaining member 220, a raised projection 225 is positioned in each notch 233 and the underside of flanges 232 rest on the other two raised projections 225. First retaining member 210 is positioned over second retaining member 220 and valve member 230 such that flanges 232 are positioned between stepped surface 218 of first retaining member 210 and upper surface 221A of second retaining member 220. Note that valve member 230 is not completely pinned in place between first retaining member 210 and second retaining member 220, but rather can move somewhat between the two. Valve assembly 200 is positioned in plunger chamber 32 as shown in FIG. 5.

In use, as plunger 41 moves downwardly as described above, liquid fertilizer is drawn into inlet 31, through fluid passageway 213, past conical surface 231, around flanges 232 which are supported on projections 225 and open areas 226 into plunger chamber 32. As plunger 41 moves upwardly as described above, liquid fertilizer will flow past check pin 60, through plunger 41 and mix with water as described above. Note that as plunger 41 moves upwardly, the pressurized liquid in plunger chamber 32 causes valve member 230 to move upwardly such that conical surface 231 of valve member 230 seals against conical surface 216 of first retaining member 210.

Note that because of the close spacing and highly restricted path around sealing member 230, when plunger chamber 32 is empty a vacuum is created as plunger 41 moves downwardly. This effectively makes the fertilizer injector apparatus of the present invention self-priming in that it can draw liquid fertilizer into the empty plunger chamber 32. Note that the prior art device in U.S. Pat. No. 6,997,350 was not self-priming. This is because check ball 56 would fall adjacent the top of check pin 60 if plunger chamber 32 were filled with air and drawing plunger 41 downwardly would not create a vacuum in plunger chamber 32 sufficient to draw in liquid fertilizer through inlet 31. Thus, use of valve assembly 200 permits liquid fertilizer reservoir 10 to be replaced with a cover 110 (FIG. 10) having a fitting 111 that can be connected to a hose (not shown) which is in turn connected at its opposite end to or which has its opposite end placed in a bottle or other container of liquid fertilizer. The vacuum created by use of valve assembly 200 is sufficient to draw liquid fertilizer from the container, through the hose, through fitting 111 and into secondary reservoir 128.

Note also that use of valve assembly 200 permits orientation of the fertilizer injector apparatus of the present invention in any orientation. This is because valve assembly 200 is fixed in place in plunger chamber 32. Thus, valve member 230 is fixed in the orientation which will provide the desired sealing function and which will permit desired flow at the appropriate times regardless of orientation of the fertilizer injector apparatus. This is not true of the prior art device. For example, orienting the prior art device on its side would result in check ball 56 being displaced from inlet 31 and positioning itself on the interior surface of plunger chamber 32 away from inlet 31.

Although the present invention has been shown and described in detail, the same is to be taken by way of example only and not by way of limitation. Various alterations and modifications can be made to the embodiments discussed above without departing from the spirit and scope of the invention.

What is claimed is:

1. An apparatus for injecting liquid fertilizer into a water flow line in a sprinkler system, including:

an injector mechanism body having a water inlet and a water outlet adapted to be connected in the water flow line of the sprinkler system so that water flows through at least a portion of the injector mechanism body;

a plunger chamber;

a plunger movably positioned in the plunger chamber;

a paddle wheel positioned to be rotated by water flowing through the injector mechanism body;

a plunger gear coupled to the paddle wheel and the plunger so as to rotate when the paddle wheel rotates so as to move the plunger back and forth within the plunger chamber; and a valve assembly secured at a fixed location in the plunger chamber, the valve assembly including a valve member having a conical surface, a first flange, a second flange and first and second notches separating the first and second flanges, first means for retaining the valve member in the plunger chamber and second means for retaining the valve member in the plunger chamber, the first means for retaining having a conical surface, the second means for retaining having two projections engaging the notches of the valve member and two projections supporting the first and second flanges of the valve member so as to form fluid flow paths around the flanges and wherein the conical surface of the valve member seals against the conical surface of the first means for retaining so as to prevent fluid flow through the valve assembly in at least one direction.

2. The apparatus for injecting liquid fertilizer according to claim 1, further including a space between the first and second means for retaining and wherein the valve member is moveable in the space.

3. The apparatus for injecting liquid fertilizer according to claim 1, wherein the valve assembly permits fluid flow in only one direction.

* * * * *